:::page
United States Patent Office 3,594,417
Patented July 20, 1971

---

3,594,417
SUBSTITUTED 2-ARYLALKYLOXY BENZAMIDES
Michel Leon Thominet, Paris, France, assignor to Société d'Etudes Scientifiques et Industrielles de L'Ile-de-France, Paris, France
No Drawing. Filed Mar. 21, 1968, Ser. No. 714,795
Claims priority, application France, Apr. 3, 1967, 101,328; June 23, 1967, 111,808
Int. Cl. C07c 103/26
U.S. Cl. 260—559S    5 Claims

ABSTRACT OF THE DISCLOSURE

The 2-arylalkyloxy-benzamides of this invention are useful for the production of anesthesia, such as local anesthesia, in mammals. When administered intramuscularly, compounds of this invention show significant anesthesia when compared with xylocaine. Again, intradermic injections of 0.2 ml. of a solution of such a compound in concentrations varying from 0.1 to 1.25 mg./ml. effect suppression of platysma tremor produced by the prick of a pin in guinea pigs. The $LD_{50}$ dosage of the compounds evaluated on mice and rats proved compatible in therapeutic use on mammals.

---

This invention relates to 2-arylalkyloxy benzamides and more particularly to 2-arylalkyloxy benzamides having the formula:

(1)
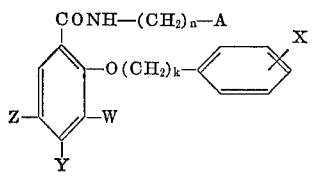

in which A is monoalkylamino, dialkylamino, a monovalent radical having the formula:

(2)
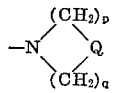

or a monovalent heterocyclic radical having the formula:

(3)
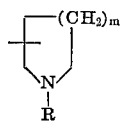

in which $p$ and $q$ are 1 or 2, at least one of $p$ and $q$ being 2; Q is methylene, sulphur, oxygen, nitrogen or monoalkylamino; $m$ is a positive integer less than 3; R is an alkyl group having from 1 to 5 carbon atoms; W, Y and Z are hydrogen, halogen, amino or alkylamino in which the alkyl group has from 1 to 5 carbon atoms; X is H or halogen and $n$ and $k$ are 1 or 2. The monovalent radical (2) may be pyrrolidyl, piperidinyl, imidazolidinyl, piperazino, methylpiperazino, morpholino or thiazolidinyl. The halogen X, as well as any of the substituents W, Y and Z, may be fluorine, chlorine, bromine or iodine. The alkyl groups of the monoalkylamino and dialkylamino are desirably lower alkyls and preferably alkyl groups of less than 6 carbon atoms such as methyl, ethyl or isobutyl.

The 2-arylalkyloxy benzamides obtained, their salts of addition with acids and their quaternary ammonium salts are new compounds which have not been the object of any publication prior to filing the present application.

The substituted 2-arylalkyloxy benzamides of this invention are produced by reacting a 2-arylalkyloxy benzoic acid derivative having the formula:

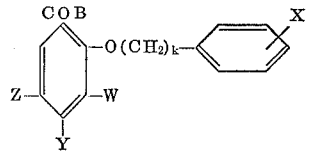

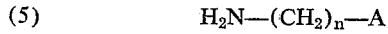

in which B is a labile radical formed by a chlorine atom and the alkoxy groups having from 1 to 5 carbon atoms. W, X, Y, Z, $k$ have the same significance as heretofore defined;
with a diamine having the formula:

(5)         $H_2N—(CH_2)_n—A$ in which A and $n$ have the same significance as heretofore defined.

Salts of mineral acids (e.g. hydrochloric, sulphuric or phosphoric acids) or salts of organic acids (e.g. acetic, oxalic, tartaric or methanesulphonic acids) are produced by reacting the required acid with the benzamides.

The quaternary ammonium salts are obtained by reacting the benzamides with an alkylating agent (methyl bromide, ethyl iodide, methyl p-toluene-sulphonate etc.)

A more comprehensive understanding of this invention is obtained by reference to the following examples.

EXAMPLE I

N-(diethylaminoethyl)-2-benzyloxy-4-amino-5-chlorobenzamide 82 g. (0.245 mole) of methyl 2-benzyloxy-4-acetamino-5-chlorobenzoate, 246 ml. of ethylene glycol and 87 g. (0.245 mole ×3) of diethylaminoethylamine, are placed in a one liter balloon flask provided with an agitator and a reflux condenser. The mixture is heated in an oil bath at 120° C. for 4 hours at 30° C. 246 ml. of 2.5 N sodium carbonate solution previously heated at 90 to 95° C. is then added to the solution and the mixture is maintained under reflux for one hour. After cooling 400 ml. of water is added. The benzamide formed crystallizes. It is dried without heating, washed in water and dried in the air. It is then recrystallized with 134 ml. of benzene. N-(diethylaminoethyl) - 2-benzyloxy-4-amino-5-chlorobenzamide is obtained in the form of white crystals (melting point: 95° C.)

EXAMPLE II

N-(diethylaminoethyl) 2-benzyloxy-3,5-dichlorobenzamide 129 g. (0.36 mole ×3) of thionyl chloride and 53.5 g. (0.18 mole) of 2-benzyloxy-3,5-dichlorobenzoic acid are placed in a 500 ml. balloon flask provided with a reflux condenser.

The mixture is heated in a water bath until the reagents dissolve (2 hours 45 min.). The mixture is then cooled and the second half of the 2-benzyloxy-3,5-dichlorobenzoic acid (53.5 g.) is then added. The mixture is heated at from 40 to 45° C. for about two hours and then at 70° C. for the same period. The excess of thionyl chloride is distilled off. 115 g. of 2-benzyloxy-3,5-dichlorobenzoyl chloride are obtained.

43 g. (0.365 mole) of diethylaminoethylamine dissolved in 110 ml. of methylethylketone is placed in a one liter balloon flask provided with an agitator, a thermometer and a dropping funnel. While maintaining the internal temperature of the balloon flask at from 0 to 5° C., the acid chloride dissolved in 90 ml. of methylethylketone is poured in drop by drop with agitation.

To prepare the oxlate of the N(diethylaminoethyl)-2-benzyloxy-3,5-dichlorobenzamide formed, 500 ml. of water and 37 ml. of 20% ammonia are added. The base is extracted with methylene chloride. It is dried on potassium carbonate and the solvent is distilled in a water bath. The 70 g. (0.1775 mole) of the base obtained is then dissolved in 250 ml. of absolute alcohol and 19 g. of oxalic acid (0.1775 mole +20% excess) is added. N(diethylaminoethyl)-2-benzyloxy-3,5-dichlorobenzamide oxalate crystallizes. It is dried without heating, washed on a filter with alcohol and is dried. It is a white solid (melting point: 74° C.)

EXAMPLE III

N-(morpholinoethyl) 2-benzyloxy-4-amino-5-chlorobenzamide 48 g. (0.144 mole) of methyl 2-benzyloxy-4-acetamino-5-chlorobenzoate, 150 ml. of ethylene glycol and 56 g. (0.144 mole ×3) of morpholinoethylamine are placed in a 1 liter balloon flask provided with a reflux condenser. The mixture is heated in an oil bath at 120° C. for approximately ten hours. 150 ml. of 2.5 N sodium carbonate solution previously heated to 95° C. is then added and the mixture is maintained under reflux for one hour. After cooling 150 ml. of water is added. The benzamide formed is dried without heating, washed with 200 ml. of water and is dried. 35 g. of N(morpholinoethyl)-2-benzyloxy-4-amino-5-chlorobenzamide (melting point: 155° C.) are obtained.

EXAMPLE IV

N-(1-ethyl 2-pyrrolidylmethyl)-2-benzyloxy-3,5-dichlorobenzamide 2-benzyloxy-3,5-dichlorobenzoyl chloride is prepared as described in Example II.

21 g. (0.158 mole) of 1-ethyl-2-aminomethyl pyrrolidine dissolved in 40 ml. of methylethylketone is placed in a 500 ml. balloon flask provided with an agitator, a thermometer and a dropping funnel. While maintaining the internal temperature of the balloon flask at from 0 to 5° C., the 50 g. (0.158 mole) of acid chloride dissolved in 30 ml. of methylethylketone is poured in drop by drop under agitation. When the operation of addition is complete, agitation is continued for three more hours while the temperature is allowed to rise. The mixture is diluted with 400 ml. of water and the methylethylketone is distilled.

The solution obtained is filtered with 2 g. of animal black. The base is precipitated with ammonia and extracted with methylene chloride. The organic layer is dried on potassium carbonate. The methylene chloride is distilled in a water bath until it has constant weight. N-(1-ethyl 2-pyrrolidylmethyl) - benzyloxy-3,5-dichlorobenzamide is obtained, occurring in the form of white crystals (melting point: 74° C.).

EXAMPLE V

N-(diethylaminoethyl)2-(p-chloro-benzyloxy)-3,5-dichlorobenzamide 16 g. of diethylaminoethylamine dissolved in 40 ml. of methylethylketone is introduced into a 4.5 liter three-neck balloon flask provided with an agitator, a thermometer and a dropping funnel.

While maintaining the internal temperature of the balloon flask at from 0 to 5° C., 48 g. of 2(p-chlorobenzyloxy)-3,5-dichlorobenzoyl chloride dissolved in 100 ml. of methylethylketone is poured in drop by drop and with agitation.

Agitation is effected for two hours at ambient temperature and the mixture is left at rest for one night at +4° C. The product formed is dried without heating, washed being made into a paste with acetone and is dried at 50° C.

45 g. of N(diethylaminoethyl) 2-(p-chloro-benzyloxy)-3,5-dichlorobenzamide is obtained. Yield 70.5%. Melting point: 136–140° C.

EXAMPLE VI

N-(diethylaminoethyl)-2-phenethyloxy-3,5-dichlorobenzamide 15 g. of diethylaminoethylamine is dissolved in 38 ml. of methylethylketone in a 500 ml. balloon flask. 41 g. of 2-phenethyloxy-3,5-dichlorobenzoyl chloride in solution in 32 ml. of methylethylketone is added drop by drop, the temperature being maintained at from 0 to 50° C.

The mixture is allowed to return to ambient temperature while agitation is maintained. It is left overnight at +4° C., 185 ml. of water is added and the methylethylketone is distilled.

The solution obtained is filtered with 3 g. of animal black. The base is precipitated by adding ammonia and is extracted with methylene chloride. The organic layer is dried on potassium carbonate. The methylene chloride is distilled in a water bath, operation being concluded under vacuum.

40 g. of N-(diethylaminoethyl)-2-phenethyloxy-3,5-dichlorobenzamide is obtained. Yield 78.7%.

The citrate is obtained by adding 25 g. (0.1 mole +10% excess) of citric acid dissolved in heated 200 ml. of isopropanol to 40 g. of the base dissolved in 80 ml. of isopropanol.

The mixture is left overnight at +4° C. and the citrate crystallizes. It is dried without heating, washed with ice cold isopropanol and is dried.

50 g. of N-(diethylaminoethyl)-2-phenethyloxy-3,5-dichlorobenzamide citrate is obtained. Yield: 85%. Melting point: 87° C.

Tests were conducted to determine the toxicity and therapeutic efficacy of the compounds of this invention.

The $LD_{50}$ values on mice and rats showed the safety of the compounds of this invention at effective therapeutic doses or concentrations. The following tables show the $LD_{50}$ of such compounds when tested with mice and rats:

| Compounds | $DL_{50}$ in mg./kg. (compounds in base form) i.v. | |
|---|---|---|
| | Mouse | Rat |
| N-(diethylaminoethyl)2-benzyloxy-4-amino-5-chlorobenzamide | 6.4 | |
| N-(diethylaminoethyl)-2-benzyloxy-3,5-dichlorobenzamide | 15 | 14.5 |
| N-(morpholinoethyl)-2-benzyloxy-4-amino-5-chlorobenzamide | 37 | |
| N-(1-ethyl 2-pyrrolidylmethyl)2-benzyloxy-3,5-dichlorobenzamide | 12 | 13.5 |

Compounds: $DL_{50}$ in mg./kg. (compounds in base form) I.P.
N-(diethylaminoethyl)-2-benzyloxy 4-amino-5-chlorobenzamide _____ 41.9
N-(diethylaminoethyl)-2-benzyloxy-3,5-dichlorobenzamide _____ 96
N-(morpholinoethyl)-2-benzyloxy-4-amino-5-chlorobenzamide _____ >150
N-(1-ethyl-2-pyrrolidylmethyl)-2-benzyloxy-3,5-dichlorobenzamide _____ 108

Compounds: $DL_{50}$ in mg./kg. (compounds in base form) S.C.
N-(diethylamino)-2-benzyloxy-4-amino-5-chlorobenzamide _____ 50
N-(diethylaminoethyl)-2-benzyloxy-3,5-dichlorobenzamide _____ 186
N-(morpholinoethyl)-2-benzyloxy-4-amino-5-chlorobenzamide _____ >150
N-(1-ethyl-2-pyrrolidylmethyl)-2-benzyloxy-3,5-dichlorobenzamide _____ 376

DL₅₀ in mg./kg. (compounds in base form) per os

Compounds:
N-(diethylaminoethyl)-2-benzyloxy-4-amino-5-chlorobenzamide _____ 220
N-(diethylaminoethyl)-2-benzyloxy-3,5-dichlorobenzamide _____ 640
N-(morpholinoethyl)-2-benzyloxy-4-amino-5-chlorobenzamide _____ 1.5
N-(1-ethyl-2-pyrrolidylmethyl)-2-benzyloxy-3,5-dichlorobenzamide _____ 576

The local anaesthetic properties of the benzamides of the present invention were revealed from the different tests described hereinafter.

Local surface anaesthesia was determined by the Regnier method which comprises studying the suppression of the oculopalpebral reflex on the rabbit cornea.

Studying a group of 10 rabbits, the depth of cornean anaesthesia obtained after dropping into the eye 11 drops of the aqueous solution of the product to be studied by comparison with that produced by two aqueous solutions of cocaine hydrochloride in different concentrations. The experiment is effected in cross tests at intervals of one week.

The result summarised hereinafter in the tables are given by way of example. The average number per hour of strokes with a coarse hair on the cornea which gave no reaction indicate the degree of anaesthesia. A number equal to 1300 corresponds to complete anaesthesia for 60 minutes. A number equal to 13 corresponds to an absence of anaesthesia.

| Products | Concentration, percent | Average number per hour of strokes with coarse hair |
|---|---|---|
| Cocaine | 0.5 | 676 |
| N-(diethylaminoethyl)2-benzyloxy-3,5-dichlorobenzamide | 0.02 | 493 |
| Cocaine | 0.25 | 245 |
| Do | 0.5 | 588 |
| N-(1-ethyl-2-pyrrolidylmethyl)-2-benzyloxy-3,5-dichlorobenzamide | 0.5 | 1,017 |
| Cocaine | 1 | 986 |

From these results can be deduced the local anaesthetic power of these two compounds with respect to cocaine.

| Products | Concentration, percent | Concentration of cocaine giving the same anaesthetic power, percent | Activity index |
|---|---|---|---|
| N-(diethylaminoethyl)2-benzyloxy-3,5-dichlorobenzamide | 0.02 | 0.39 | 20 |
| N-(1-ethyl-2-pyrrolidylmethyl)-2-benzyloxy-3,5-dichlorobenzamide | 0.5 | 1 | 2 |
| Cocaine | 0.5 | 1 | 1 |

(2) Anaesthesia of small blood vessels was effected by intramuscular injection of the product to be studied into the theca of the sciatic nerve of a rat. The criterion of anaesthesia is the non-withdrawal of the rear leg after pinching the median toes with a jawless Pean pincer.

Three groups of ten male rats are treated with increasing concentrations of the anaesthetic under study. In each group the percentage of animals which does not react to the pinching of the leg is measured, which permits the effective anaesthetic dose 50 to be determined. The experiments are effected on two compounds of the invention given by way of example in comparison with xylocaine.

| Products | Concentrations in mg./ml. | Percent of anaesthesia | D.E.₅₀ in mg./ ml. base |
|---|---|---|---|
| Experiment No. 1 | | | |
| N-(diethylaminoethyl)-2-benzyloxy-3,5-dichlorobenzamide | 1 / 0.5 / 0.25 | 67 / 37 / 7 | 0.68 |
| Xylocaine | 8 / 4 / 2 | 73 / 60 / 33 | 3.2 |
| Experiment No. 2 | | | |
| N-(diethylaminoethyl)-2-benzyloxy-3,5-dichlorobenzamide | 1.2 / 0.6 / 0.3 | 56 / 33 / 13 | 1 |
| Xylocaine | 8 / 4 / 2 | 66 / 60 / 36 | 3.15 |
| Experiment No. 1 | | | |
| N-(1-ethyl-2-pyrrolidylmethyl)2-benzyloxy-3,5-dichlorobenzamide | 3 / 1.5 / 0.75 | 60 / 43 / 33 | 1.9 |
| Xylocaine | 8 / 4 / 2 | 80 / 57 / 40 | 3 |
| Experiment No. 2 | | | |
| N-(1-ethyl-2-pyrrolidylmethyl)2-benzyloxy-3,5-dichlorobenzamide | 2 / 1 / 0.5 | 50 / 40 / 17 | 1.8 |
| Xylocaine | 8 / 4 / 2 | 67 / 47 / 37 | 3.8 |

From these results can be deduced the local anaesthetic power of these two compounds with respect to xylocaine.

Products: Activity index
N - (diethylaminoethyl)2 - benzyloxy - 3,5 - dichlorobenzamide _____ 3–4
N - (1-ethyl-2-pyrrolidylmethyl)-2-benzyloxy-3,5-dichlorobenzamide _____ 1.5–2
Xylocaine _____ 1

(3) Research into infiltration anaesthesia is effected by intradermic injection into the skin on the back of a guinea-pig. The criterion of the anaesthesia is the suppression of the platysma tremor produced by the prick of a pin. Intradermic injections of 0.2 ml. of solution of the products to be studied in increasing concentrations were effected on groups of 10 guinea-pigs. The depth of anaesthesia is measured with respect to procaine.

| Products | Concentrations in mg./ml. | Average number of pinpricks for 30 m. | Percent of anaesthesia | D.E.₅₀ in mg./ ml. base |
|---|---|---|---|---|
| N-(diethylaminoethyl) 2-benzyloxy-3,5-dichlorobenzamide | 0.4 / 0.2 / 0.1 | 19.6 / 12.15 / 5.1 | 54 / 34 / 14 | 0.35 |
| Procaine | 5 / 2.5 / 1.25 | 27.55 / 14.05 / 4.9 | 76 / 39 / 14 | 3 |
| N-(1-ethyl 2-pyrrolidylmethyl)2-benzyloxy-3,5-dichlorobenzamide | 1.25 / 0.5 | 34.1 / 12.5 | 95 / 35 | ≠0.6 |
| Procaine | 2.5 / 1.25 | 20.4 / 6.65 | 57 / 18 | ≠2.2 |

The experimental results were confirmed in clinics where the products of the invention were administered in the form of tablets, phials, ointments of aerosols of one of their pharmacologically acceptable salts.

What is claimed is:

1. A compound selected from the class consisting of 2-arylalkyloxy benzamides and their pharmaceutically acceptable acid and quaternary ammonium salts, said substituted 2-arylalkyloxy benzamides having the formula:

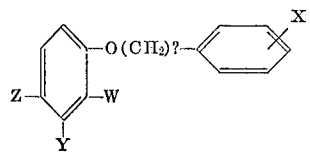

in which A is monoalkylamino or dialkylamino wherein said alkyl is less than 6 carbon atoms; W, Y and Z are hydrogen, halogen, amino or alkylamino, in which the alkyl group has from 1 to 5 carbon atoms; X is hydrogen or halogen and $n$ and $k$ are 1 or 2; at least one of W, Y and Z being other than hydrogen.

2. N-(diethylaminoethyl) - 2 - benzyloxy - 4 - amino-5-chlorobenzamide.

3. N-(diethylaminoethyl) - 2 - benzyloxy-3,5-dichlorobenzamide.

4. N-(diethylaminoethyl - 2 - p-chlorobenzyloxy-3,5-dichlorobenzamide.

5. N - (diethylaminoethyl)-2-phenethyloxy-3,5-dichlorobenzamide.

References Cited
UNITED STATES PATENTS
3,177,252  4/1965  Thominet _____ 260—559

FOREIGN PATENTS
1,098,001  1/1961  Germany.

ALEX MAZEL, Primary Examiner

B. DENTZ, Assistant Examiner

U.S. Cl. X.R.

260—297.2, 306.7, 239, 268, 294, 309.7, 326.3; 424—248, 267, 274, 273, 270, 250

UNITED STATES PATENT OFFICE
CERTIFICATE OF CORRECTION

Patent No. 3,594,417    Dated July 20, 1971

Inventor(s) Michel Leon Thominet

It is certified that error appears in the above-identified patent and that said Letters Patent are hereby corrected as shown below:

Column 2, lines 4 to 10, the formula should appear as shown below:

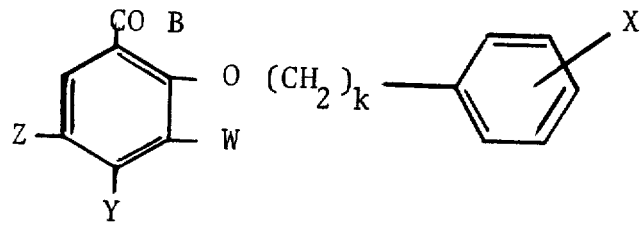

Column 6, line 5, "nl." should read -- ml. --; lines 69 to 75, the formula should appear as shown below:

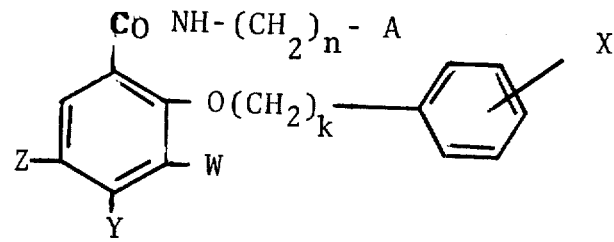

Signed and sealed this 23rd day of May 1972.

(SEAL)
Attest:

EDWARD M. FLETCHER, JR.
Attesting Officer

ROBERT GOTTSCHALK
Commissioner of Patents